Oct. 30, 1928.
A. J. MEENTS
1,689,886
COMBINED SHOVEL, HOE, AND RAKE
Filed Nov. 11, 1927
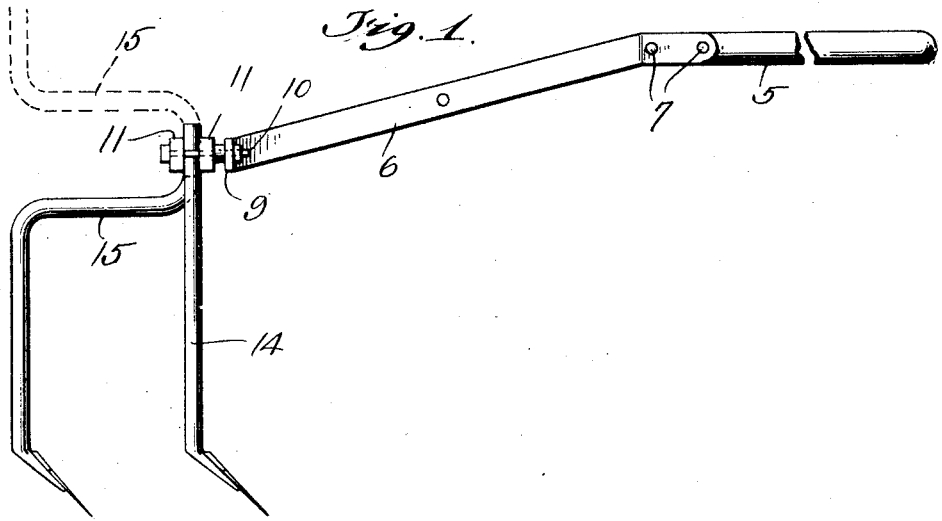
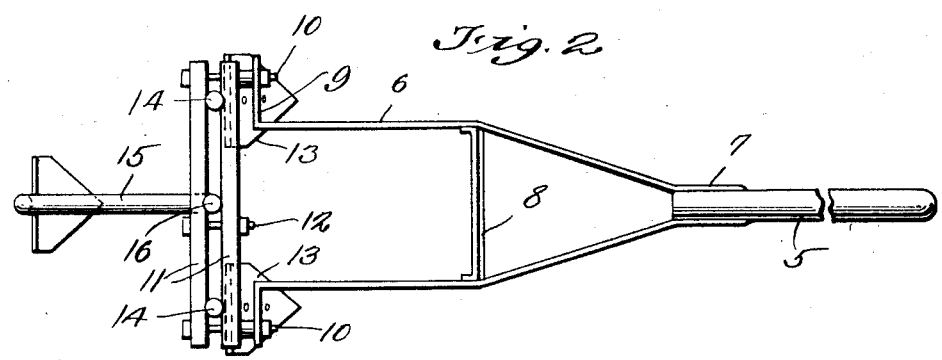
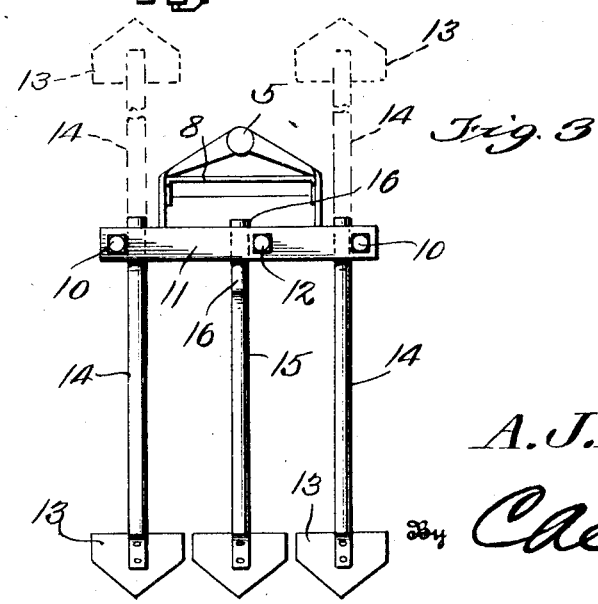
Inventor
A. J. Meents
By C. A. Snow & Co.
Attorney Patented Oct. 30, 1928.

1,689,886

UNITED STATES PATENT OFFICE.

ADOLF J. MEENTS, OF ALBERT CITY, IOWA.

COMBINED SHOVEL, HOE, AND RAKE.

Application filed November 11, 1927. Serial No. 232,639.

This invention relates to garden implements, and aims to provide a novel form of implement which may be readily and easily converted from a harrow of the hand-operated type, to a rake or cultivator, at the will of the operator.

Another object of the invention is to provide an implement of this character which may be moved in the hands of the operator to bring a single shovel in play to form a furrow so that when the furrow has been made and the seed planted, the implement may be reversed, bringing the pair of shovels at the opposite side of the head into play to cover the furrow.

A still further object of the invention is to provide a device of this character wherein the supporting shanks of the blades may be readily and easily removed or replaced in such a way that the implement may be reversed while in operation, thereby adapting the implement for various usages.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of an implement constructed in accordance with the invention and showing the central blade in dotted lines in its upper position.

Figure 2 is a plan view of the implement.

Figure 3 is a front elevational view thereof.

Referring to the drawing in detail, the tool includes a handle portion 5 formed with an extension 6 embodying spaced bars connected with the handle 5 as at 7, the bars being held in spaced relation by means of the bar 8.

As shown by Figure 2, the bars have right angled end portions 9 formed with openings to accommodate the bolts 10, which bolts also pass through the bars 11 forming the head of the implement to secure the head to the bars of the extension 6.

A central bolt 12 also passes through the bars 11 of the head to secure the central portions of the bars in clamping relation with each other. The reference character 13 indicates shovel blades that are connected with the rods 14 which in turn are disposed between the bars 11 of the head and clamped in such position by means of the bolts 10 and 12.

The central shovel is provided with a shank which is curved inwardly as at 15 and upwardly as at 16, to the end that the shovel at the central portion of the head extends outwardly beyond the head as clearly shown by Figure 1. Thus it will be seen that when the device is to be used as a cultivator or harrow, the implement may be moved through the soil as a hoe would be moved through the soil, in hoeing vegetables, but should it be desired to straddle a row, to cultivate on opposite sides thereof, the central shovel may be removed and secured in a position as shown in dotted lines in Figure 1, thereby providing a space between the outer shovels and permitting the implement to be moved over a row of growing plants, the plants passing between the shovels 13.

Should it be desired to break a large clod or dig up the soil at a particular place, during the act of cultivating, it is obvious that the tool may be reversed and the central shovel brought into play to accomplish this purpose.

I claim:

1. A garden implement including a handle, an extension at one end of the handle, the extension embodying a pair of spaced bars having right angled ends, a head including transversely disposed bars, shovels having shanks, said shanks adapted to be positioned between the transversely disposed bars of the head, and bolts extending through the transversely disposed bars and right angled ends for securing the shanks between the transversely disposed bars.

2. A garden implement including a handle, an extension at one end of the handle, said extension having right angled extremities, a head removably secured to the right angled extensions, a pair of shovels supported adjacent to the ends of the head, said shovels including vertical shanks, a shovel disposed between the first mentioned shovels and having a curved shank, the last mentioned shovel being extended beyond the first mentioned shovels and bolts extending through the head and right angled ends to secure the head in position.

In testimony that I claim the foregoing as my own, I have hereto affixed my signature.

ADOLF J. MEENTS.